Figure 1:
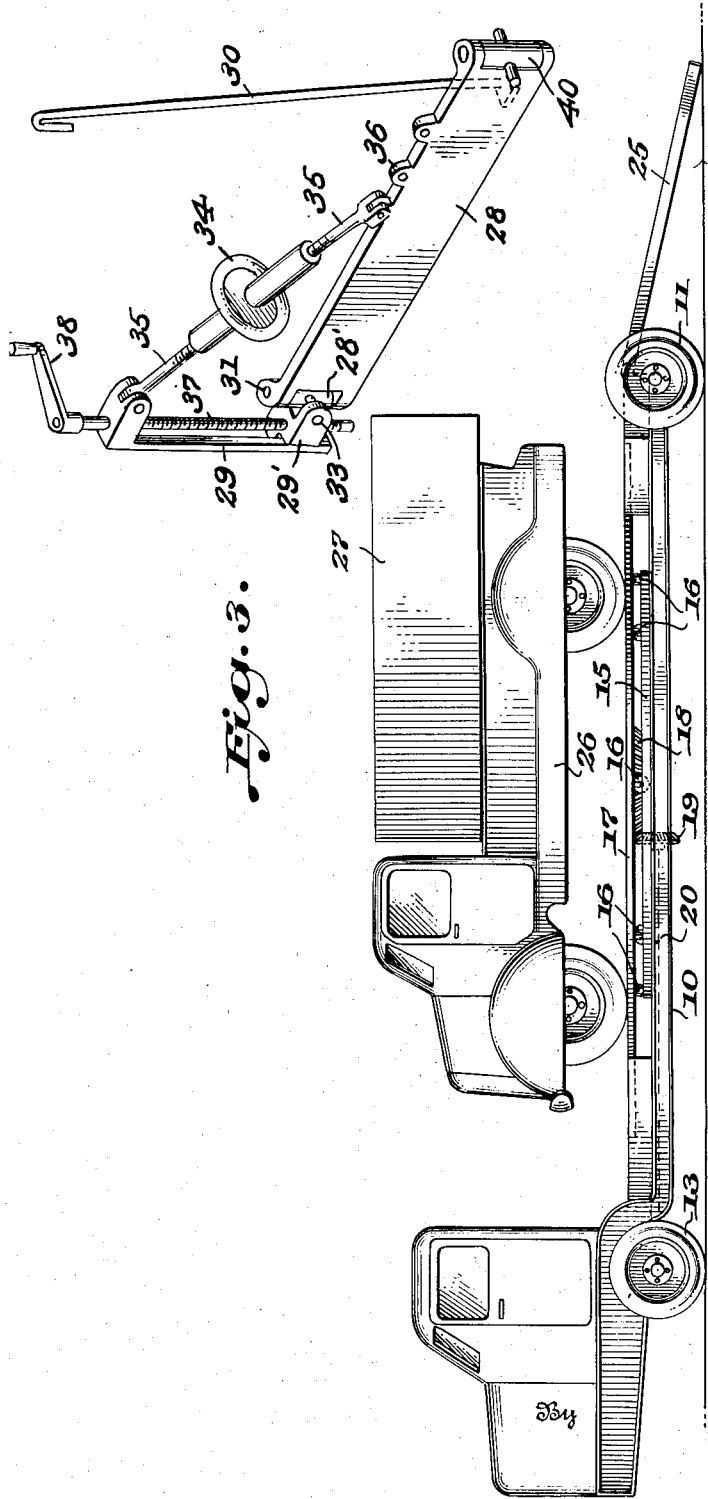

Oct. 23, 1951 H. T. SMITH 2,572,776
SUBGRADE AND SHOULDERING MACHINE
Filed Aug. 3, 1948 2 SHEETS—SHEET 1

Inventor
*Harry T. Smith,*
By
*R. W. Dahn,*
atty.

Oct. 23, 1951 — H. T. SMITH — 2,572,776
SUBGRADE AND SHOULDERING MACHINE
Filed Aug. 3, 1948 — 2 SHEETS—SHEET 2

Inventor
Harry T. Smith,
By
atty.

Patented Oct. 23, 1951

2,572,776

UNITED STATES PATENT OFFICE 2,572,776

SUBGRADE AND SHOULDERING MACHINE

Harry T. Smith, Hixton, Wis.

Application August 3, 1948, Serial No. 42,176

3 Claims. (Cl. 94—44)

1

My invention relates to road working machinery, and it is an object of the same to provide means for facilitating the unloading of trucks by dumping their loads in desired places at the side of the roadbed as in forming shoulders on a road.

Another object is to provide improved means for transporting heavy machinery and the like.

Another object is to provide improved means for leveling material discharged at the side of a road, such means operating in conjunction with the material depositing means and being adapted to level the surface of the same immediately after the material has been so deposited.

Referring to the annexed drawings, which are made a part of this application and in which similar reference characters indicate similar parts:

Figure 1 is a side elevation of the machine of my invention, with a loaded truck supported thereon.

Figure 2:
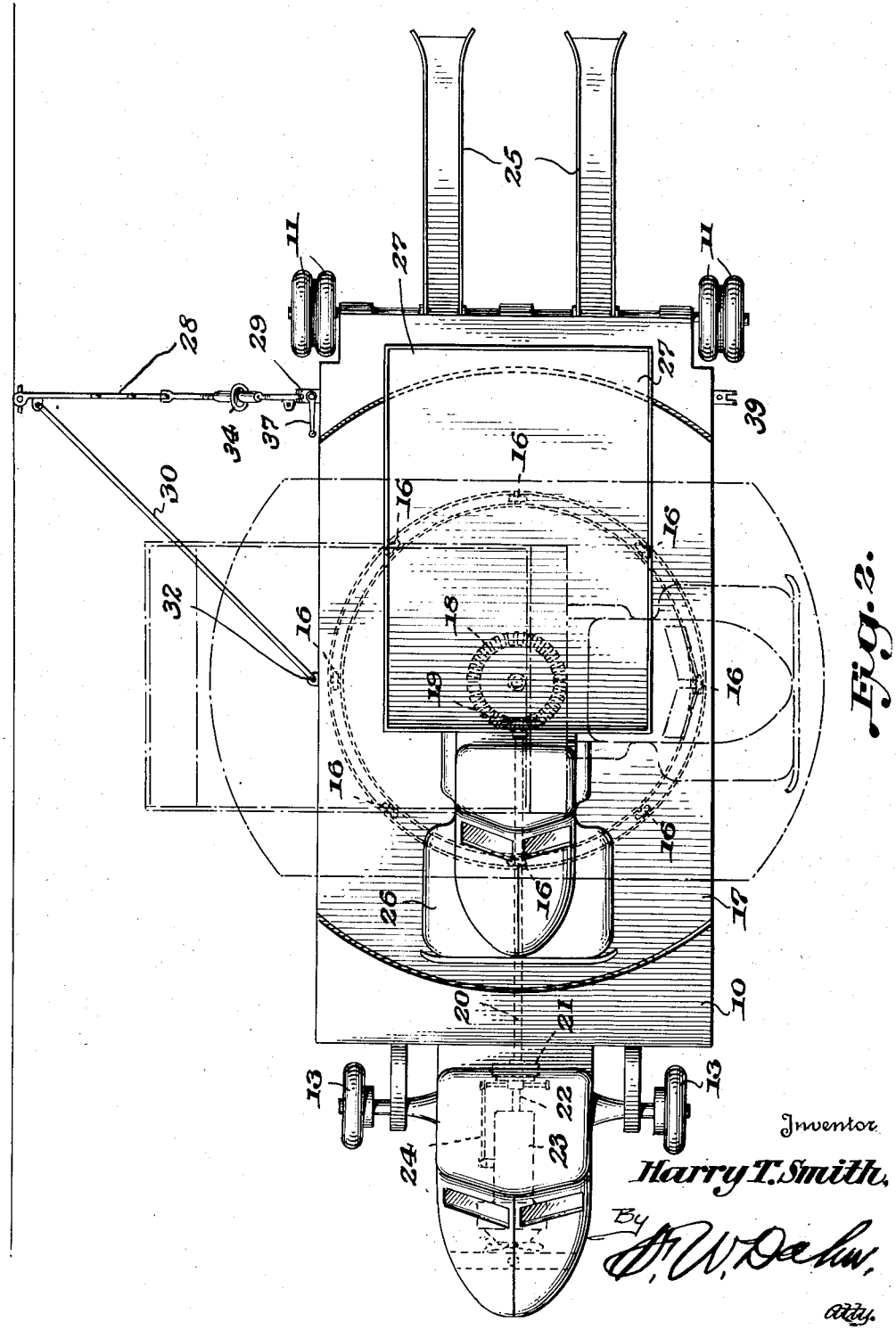

Figure 2, a top plan of the same, illustrating in dotted lines the dumping position of the parts, and Figure 3, a perspective of a leveling blade.

In the drawings, reference character 10 indicates generally the body or chassis of a long low truck or industrial trailer for special uses such as above referred to, this truck having at its rear end wheels mounted in any conventional or desirable manner on the body, and having front wheels 13 for driving and steering the truck.

The chassis includes a circular bearing plate 15 that is fixed in place, and upon which there are arranged a circular series of roller bearings 16 which are journaled on radially arranged pins carried by the plate 15 and suitably spaced apart. The roller bearings support a turntable 17 that has a gear 18 integral therewith or fixed thereto. A pinion 19 meshes with the gear 18 for driving the turntable, the pinion being on a shaft 20, connected by a clutch 21 with a power take-off 22 of any suitable character, connected to the motor 23 of the main truck, clutch-operating means being indicated at 24.

At the rear of the truck there are provided detachable inclined runways 25 that may be placed as shown in Figure 1 for allowing an ordinary truck or other wheeled vehicle to be driven or otherwise propelled upon the turntable, and obviously the runways may serve as skids for the loading or unloading of other heavy objects in connection with their transportation.

It should be noted that the turntable is squared off at the sides so as to be only as wide as the main truck, so that it is considerably longer in the direction of movement of the main truck than it is wide. As a result it is possible to move the main truck over narrow roads and narrow bridges without any difficulty, while also the dumping of loads from trucks of substantial size is made possible, as well as the dumping of their loads at a considerable distance from the middle of the road and from the wheels of the main truck. This also makes it possible to transport long and heavy machinery, such as shovels, caterpillar tractors, other tractors, and the like, and to deliver the same either endwise of the main truck or at either side of the same. The bearing for supporting the turntable is of a diameter substantially equal to the width of the main truck and the turntable so as to afford a very stable support for the load.

A truck of conventional design is shown at 26 as having been driven up on the turntable and it will be seen that the body 27 of this truck extends out beyond the rear end of the turntable, without any danger of striking any other part when the turntable is revolved through the driving means shown. At the same time, it will also be evident that when the turntable is so revolved the truck carried thereon will extend at its rear end out beyond the turntable and quite substantially beyond the side of the main truck, so that the load may be dumped at a distance from the main truck and without any chance that part of the load will fall upon the turntable or the main truck. The position of the pump truck when ready for dumping is shown in dotted lines in Fig. 2.

To perform a preliminary leveling operation upon the material dumped at the side of the main truck, there is provided a screed or leveling blade 28 that is supported by a bracket 29 extending outward and downward from the outer rear corner of the main truck body, the bar blade being held at such a height as may be considered most advantageous. The blade is here shown as pivoted for movement backward and forward at 31 on a block 28' which is pivoted to a bracket 29' at 33 for tilting movement and it is held in place by a rod 30 that hooks into an eye 32 on the truck 10, said members 28', 29', pivoting at 31 and 33 constituting a universal joint.

A pair of pivots 33 permits the blade to swing vertically to desired position for finishing the subgrade with the desired inclination of its surface. The blade may be adjusted about pivot 33 by means of a turnbuckle 34 connecting two rod sections 35, 35, respectively pivoted to the upper end of the bracket 29 and to one of several eyes 36 arranged along the upper edge of the blade.

The sub-bracket 29' is slidable in guides on the bracket 29, and is provided with a threaded passage for engagement by the threaded portion of a shaft 37 carrying a crank 38 and held against vertical movement in an arm of bracket 29.

The leveling blade may be attached to either side of the main truck. For supporting it at the left side of the low body truck a bracket 39 is mounted on the same at the lower side of Figure 2, and is constructed to receive the pivotal block 40 at the outer end of blade 28 in the drawings. When the blade is so located at the left of the low-body trailer, the rod 30 and the turnbuckle carrying shafting will be reversed so as to be connected to points nearer the left-hand end of the blade, as will be obvious.

It will be obvious to those skilled in the art that many changes may be made in the devices herein disclosed and in the manner of making them, all without departing from the spirit of the invention; and therefore I do not limit myself to what is shown in the drawings and described in the specification, but only as indicated in the appended claims.

Having thus fully described my invention, what I claim is:

1. In a road-building machine, a body, leveling means comprising a blade extending laterally from said body, a bracket fixed to a side of said body, a block slidable in a vertical guideway on said bracket, a screw mounted in the bracket and having threaded engagement with said block, a second block mounted on horizontal pivots in the first block, vertical pivots on the second block on which said blade is mounted at one end to swing backward and forward, eyes at intervals along said blade, a pivot at the upper end of said bracket, a rod connecting the last-named pivot to said eyes selectively, and means for varying the length of said rod.

2. A device as in claim 1, including a similar bracket at the opposite side of said body, and means at the other end of the blade for connecting it to the last-named bracket.

3. In a road-building machine, a body, leveling means comprising a blade extending laterally from said body, a bracket fixed to a side of said body, a block slidable in a vertical guideway on said bracket, a universal joint connecting said block and the end of said blade nearest said body and permitting the blade to swing up and down and forward and back, and a rod connecting a point on the bracket spaced vertically from said block selectively to spaced points on the blade remote from said end of the blade.

HARRY T. SMITH.

REFERENCES CITED

The following references are of record in the file of this patent:

UNITED STATES PATENTS

| Number | Name | Date |
| --- | --- | --- |
| 1,412,389 | Dennis | Apr. 11, 1922 |
| 1,480,620 | Latture | Jan. 15, 1924 |
| 1,754,778 | Tellis | Apr. 15, 1930 |
| 1,871,473 | Schmid et al. | Aug. 16, 1932 |
| 2,023,472 | Heltzel | Dec. 10, 1935 |
| 2,184,046 | Karinshak, Jr. | Dec. 19, 1939 |